US010751775B2

(12) United States Patent
Merz et al.

(10) Patent No.: US 10,751,775 B2
(45) Date of Patent: Aug. 25, 2020

(54) DEVICE FOR TRANSMITTING A TORQUE FROM A DRIVE DEVICE ONTO A ROLLER IN A ROLL STAND

(71) Applicant: SMS group GmbH, Düsseldorf (DE)

(72) Inventors: Jürgen Merz, Kreuztal (DE); Kurt Scheffe, Hilchenbach (DE)

(73) Assignee: SMS group GmbH, Düsseldorf (DE)

( * ) Notice: Subject to any disclaimer, the term of this patent is extended or adjusted under 35 U.S.C. 154(b) by 336 days.

(21) Appl. No.: 15/735,009

(22) PCT Filed: Jun. 7, 2016

(86) PCT No.: PCT/EP2016/062825
§ 371 (c)(1),
(2) Date: Dec. 8, 2017

(87) PCT Pub. No.: WO2016/198365
PCT Pub. Date: Dec. 15, 2016

(65) Prior Publication Data
US 2018/0161838 A1    Jun. 14, 2018

(30) Foreign Application Priority Data

Jun. 10, 2015  (DE) .................. 10 2015 210 596
Nov. 30, 2015  (DE) .................. 10 2015 223 641

(51) Int. Cl.
*B21B 35/14*   (2006.01)
*F16D 3/18*    (2006.01)

(52) U.S. Cl.
CPC .......... *B21B 35/147* (2013.01); *B21B 35/141* (2013.01); *B21B 35/143* (2013.01);
(Continued)

(58) Field of Classification Search
CPC ... B21B 35/147; B21B 35/143; B21B 35/141; B21B 2275/12; B21B 35/14; F16D 3/185; F16D 2300/06
(Continued)

(56) References Cited

U.S. PATENT DOCUMENTS 1,427,110 A * 8/1922 Knight .................. B21B 35/144
                                                          464/16
1,545,628 A * 7/1925 Wolk ...................... B60R 17/00
                                                          464/7
(Continued)

FOREIGN PATENT DOCUMENTS

DE    1902894 A1    7/1970
DE    2234215 A1    1/1974
(Continued)

OTHER PUBLICATIONS

International Search Report dated Aug. 5, 2016 of corresponding International application No. PCT/EP2016/062825; 7 pgs.
(Continued)

*Primary Examiner* — Greg Binda
(74) *Attorney, Agent, or Firm* — Maier & Maier, PLLC

(57) ABSTRACT

A device for transmitting a torque from a drive device (200) onto a roller in a roll stand. In order to make the device independent from the continuous external supply of lubricant, the lubricant spaces in the two pivot bearings are connected to one another in a fluidically conductive manner by way of a feed channel and a return channel for the lubricant in the region of the spindle such that a closed circuit for the lubricant is formed, and that the least one pump device is integrated in the circuit in order to maintain the circulation of the lubricant in the circuit.

11 Claims, 3 Drawing Sheets

(52) U.S. Cl.
CPC .......... *F16D 3/185* (2013.01); *B21B 2275/12* (2013.01); *F16D 2300/06* (2013.01)

(58) Field of Classification Search
USPC .............................................. 464/7, 16, 156
See application file for complete search history.

(56) References Cited

U.S. PATENT DOCUMENTS

| | | | |
|---|---|---|---|
| 2,788,861 A * | 4/1957 | Wutscher | B21B 35/147 464/7 |
| 2,845,781 A * | 8/1958 | O'Brien | F16D 3/185 464/156 |
| 4,637,293 A | 1/1987 | Yamaguchi et al. | |
| 2012/0006138 A1 | 1/2012 | Smith, II et al. | |
| 2014/0212212 A1* | 7/2014 | Isley | F16D 1/10 |

FOREIGN PATENT DOCUMENTS

| | | |
|---|---|---|
| DE | 3303929 C1 | 7/1984 |
| DE | 3539535 C2 | 2/1990 |
| DE | 925284 C | 3/1995 |
| JP | 2012-520980 A | 9/2012 |
| WO | 2010107849 A1 | 9/2010 |

OTHER PUBLICATIONS

International Preliminary Examination Report dated May 11, 2017 of corresponding International application No. PCT/EP2016/062825; 6 pgs.
Office Action dated May 20, 2019, in corresponding Korean Application No. 10-2017-7036446; 9 pages.

* cited by examiner

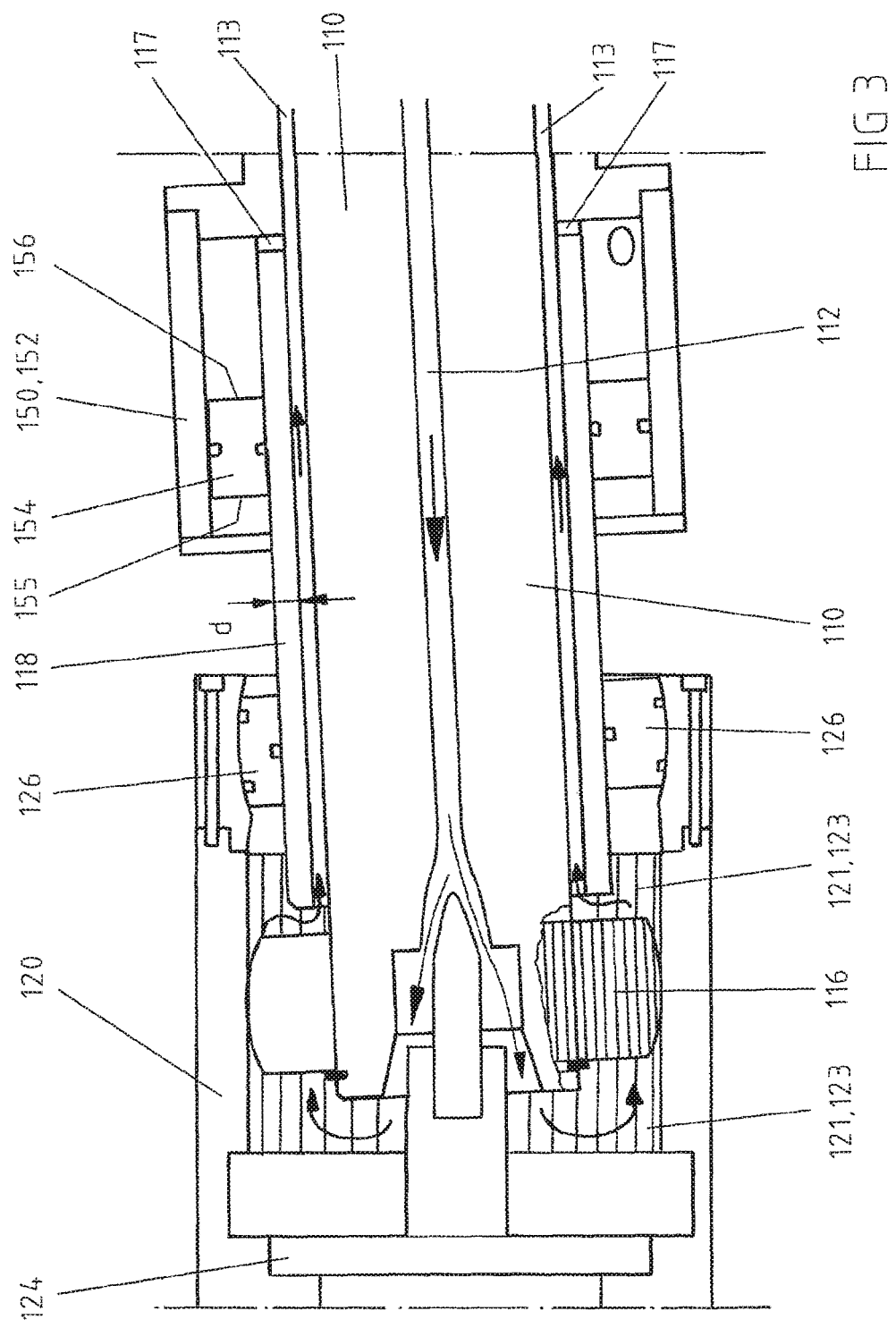

DEVICE FOR TRANSMITTING A TORQUE FROM A DRIVE DEVICE ONTO A ROLLER IN A ROLL STAND

FIELD

The invention relates to a device for transmitting a torque from a drive device to a roller in a roll stand for rolling a rolling stock that is preferably a metallic rolling stock. Similar devices are basically known from prior art, for example from the documents DE 33 03 929 C1, DE 2 234 215, DE 1 902 894 or DE 35 39 535 C2.

BACKGROUND

However, particularly relevant for the present invention seems to be the German patent DE 925 284. The patent thus discloses at least implicitly a device for transmitting a torque from a drive device to a roller in a roll stand. For this purpose, the device comprises a spindle, which is connected via a drive-side pivot bearing to a drive device. On the side of the rollers, the spindle is rotatably coupled via its roller-side pivot bearing to the pin of a roller. Furthermore, at least two pump devices are disclosed for pumping a lubricant. The pump devices comprise respectively a lubricant piston, which is radially eccentrically mounted on the roller side on the front side of the spindle, which has a fixed side and a loose side. The lubricant piston is fixed in the roller-side pivot bearing with its fixed side. On the other hand, the lubricant piston is displaceably mounted with its loose side in the axial direction in a channel on its roller-side end. The partial channel and the lubricant piston form a piston cylinder unit. When the drive-side bearing and the roller-side pivot bearing are offset so that they are arranged relative to each other in such a way that the drive shaft of the drive device and the pin of the roller are not aligned with each other, the longitudinal axis of the spindle and of the roller pin are arranged at an angle to each other. With such a constellation, a rotation of the spindle means that the lubricant piston is moved back and forth in the partial channel, which is to say that a reciprocating stroke movement is realized.

As a result of the reciprocating stroke movement of the piston, the lubricant is pumped from an external container mounted on the spindle into the actual joint connection between the spindle and the roller pin. The external container must be regularly refilled with a lubricant, which must be fresh and in particular cool.

SUMMARY OF THE DISCLOSURE

The objective of the invention is to provide supplying of lubricant to a known device for transmitting a torque from a drive device to a roller in a self-sufficient manner, which is to say independently of an external lubricant supply.

This is characterized in that a lubricant chamber is formed in each case in the drive-side pivot bearing and in the roller-side pivot bearing, and that the two lubricant chambers are mutually connected to each other via a feed channel and a return channel for the lubricant in the region of the spindle in a fluidically conductive manner, so that a closed circuit is formed for the lubricant and the pump device is integrated in the circuit in order to supply the lubricant in the circuit.

"In the region" of the spindle means for example "in the interior" of the spindle and/or on the periphery of the spindle between its outer side and a protective tube formed coaxially to the spindle.

The closed circuit for the lubricant has the advantage that continuous supplying of lubricant from outside becomes unnecessary during the current rolling operation. An exchange of the lubricant, which may be sometime necessary, can take place during a break in the rolling operations.

The terms "feed channel" and "return channel" relate merely by way of an example to the flowing direction of the lubricant with respect to the drive side. The lubricant can flow also in the opposite direction; which means that it would then make sense to reverse the relationships between the two channels.

The lubricant is for example oil.

The lubricant circulates in a completely closed circuit. In this manner, external connections, pumps, coolers, rotary oil supplies, etc., can be avoided. The necessary seals are of a conventional type. The required device is preferably of a self-sufficient type and it does not require any sensors and also no other supplying of energy are required—with the exception of the supply of energy for example by means of the drive device. The amount of the entire lubricant is increased by using the inner part of the spindle and of the protective pipe for the volume of the lubricant, plus the lubricant chambers in the pivot bearings, so that the generated amount of heat can be distributed not only to a larger volume, but it can also be delivered outside via the protective pipe. Depending on the length of the spindle, the resulting total volume of the lubricant is for example 10 to 30 liters.

According to one embodiment, the spindle is designed as a toothed, articulated spindle, which is provided with outer toothing at its two ends. At its roller-side end, the spindle is rotationally connected via its outer toothing, which is engaged by the inner toothing in the roller-side pivot bearing. Similarly, the spindle is rotationally connected via its outer toothing, which is engaged on its drive-side end by the inner toothing in the drive-side pivot bearing.

The lubricant chambers in the drive-side and in the roller-side pivot bearing are respectively sealed toward the drive device or the pin of the roller by a radially extending separating wall in the interior of the respective sleeve of the pivot bearing. In the radial direction, the sealing is realized by means of the sleeves themselves, and at the side of the rollers or at the drive-side, the sealing of the lubricant chamber is realized with a ring seal that is set on the spindle.

According to another embodiment of the invention, the at least one pump device is designed in such a way that it is driven by the rotation of the spindle. The at least one pump device according to the invention is formed by a channel section of the circuit, which connects the lubricant channel to the return channel, preferably in the roller-side pivot bearing, to the feed channel in the fluid-conducting area. The pump device further comprises also a radially eccentric lubricant piston, preferably mounted on the roller-side front face with a fixed side and with a loose side. The lubricant piston is fixed in the axial direction with its fixed side at the separating wall, preferably in the roller-side sleeve. On the other hand, the lubricant piston is slidably mounted in a partial channel of the channel section, preferably on the roller-side front face of the spindle, wherein the partial channel and the lubricant piston form a first piston-cylinder unit.

As an alternative or in addition, such a pump device can be also formed in the drive-side pivot bearing.

When the pump device is arranged in this embodiment on the drive side and the roller-side pivot bearing is arranged at an offset in such a way that the drive shaft of the drive device and the pin of the roller are not mutually aligned, the spindle is arranged at an angle to the roller pin. This is the precondition for the lubricant piston according to the described embodiment of the pump device to execute with its loose side said reciprocating stroke movement in the partial channel; so that the lubricant can be supplied in the circuit in this manner. An external drive for the pump device is not required, since the device is driven exclusively by the rotation of the spindle.

In particular in the cases when the rollers are axially shifted in the roll stand during the rolling operation, the position can change, in particular the position of the drive-side spindle within the drive-side pivot bearing, specifically inside the drive-side sleeve thereof. For example, the drive-side end of the spindle is axially displaceable in the drive-side sleeve—relative to the longitudinal axis of the sleeve; the sleeve and the inner toothing built therein have a correspondingly long form. With such an axial displacement of one end of the spindle inside the sleeve, the volume of the lubricant chamber inside the pivot bearing is changed. When the volume of the lubricant chamber is increased, a greater amount of the lubricant must be supplied to the circuit; while conversely, when the volume is reduced, the lubricant is removed from the circuit and temporarily stored in a reservoir. The function of the reservoir is preferably provided by a compensating container, which is arranged on the outer side of the spindle and which is fluidically connected to the circuit for the lubricant. The compensating container is preferably designed in the form of a second piston-cylinder unit, wherein an annular compensating cylinder is arranged on the outer side of the spindle and coaxially to its longitudinal axis. Furthermore, an annular floating piston is axially guided in the annular compensating cylinder in a slidable manner, so that the floating piston is exposed with one of its front faces to the pressure of the ambient air and with another of its front faces it delimits the reservoir with respect to the lubricant.

The feed channel or the return channel for the lubricant is preferably offset from the neutral fiber radially outward within or on the periphery of the spindle, preferably between a protective tube built between the outer wall of the spindle and a channel that is extending so that it is offset in the radially outward direction, which should not exceed a predetermined threshold thickness value, wherein the thickness threshold value is selected in such a way that a desired heat amount of the lubricant flowing in the channel can be discharged by the outer wall with convection to the environment.

To this extent, the outer wall of the spindle or the outer wall of the channel that is offset in the outward direction functions as a heat exchanger for cooling the lubricant, which is heated in the pivot bearing and discharged from it.

It is preferred when a ball joint connection is provided in the roller-side pivot bearing for connecting the roller-side front face of the spindle to the fixed separating wall in the roller-side sleeve. In this manner it is ensured that in particular translational movements of the roller or of the roller pin will be transmitted to the spindle, wherein a change of the ball joint connection resulting from the angle of the oblique position of the spindle to the roller pin is preferably tolerated in an advantageous manner. The dual design of the ball head connection represents a form-fitting and force-fitting connection. It allows to follow a reciprocating stroke movement of the spindle with the spindle in an inclined position relative to the longitudinal axis of the roller or of the roller pin, so that the sleeve does not follow the reciprocating stroke movement. In addition, the pairing of the material of the ball head connection is selected in such a way that additional sealing is not required.

BRIEF DESCRIPTION OF THE DRAWING

The description is accompanied by three figures, which show the following:

FIG. 3 a detailed view of the drive-side pivot bearing with a spindle mounted therein.

The invention will be described below with reference to the figures and described in detail in the form of embodiments. The same technical elements are provided with the same reference numbers in the figures.

DETAILED DESCRIPTION OF THE DRAWING

Figure 1:
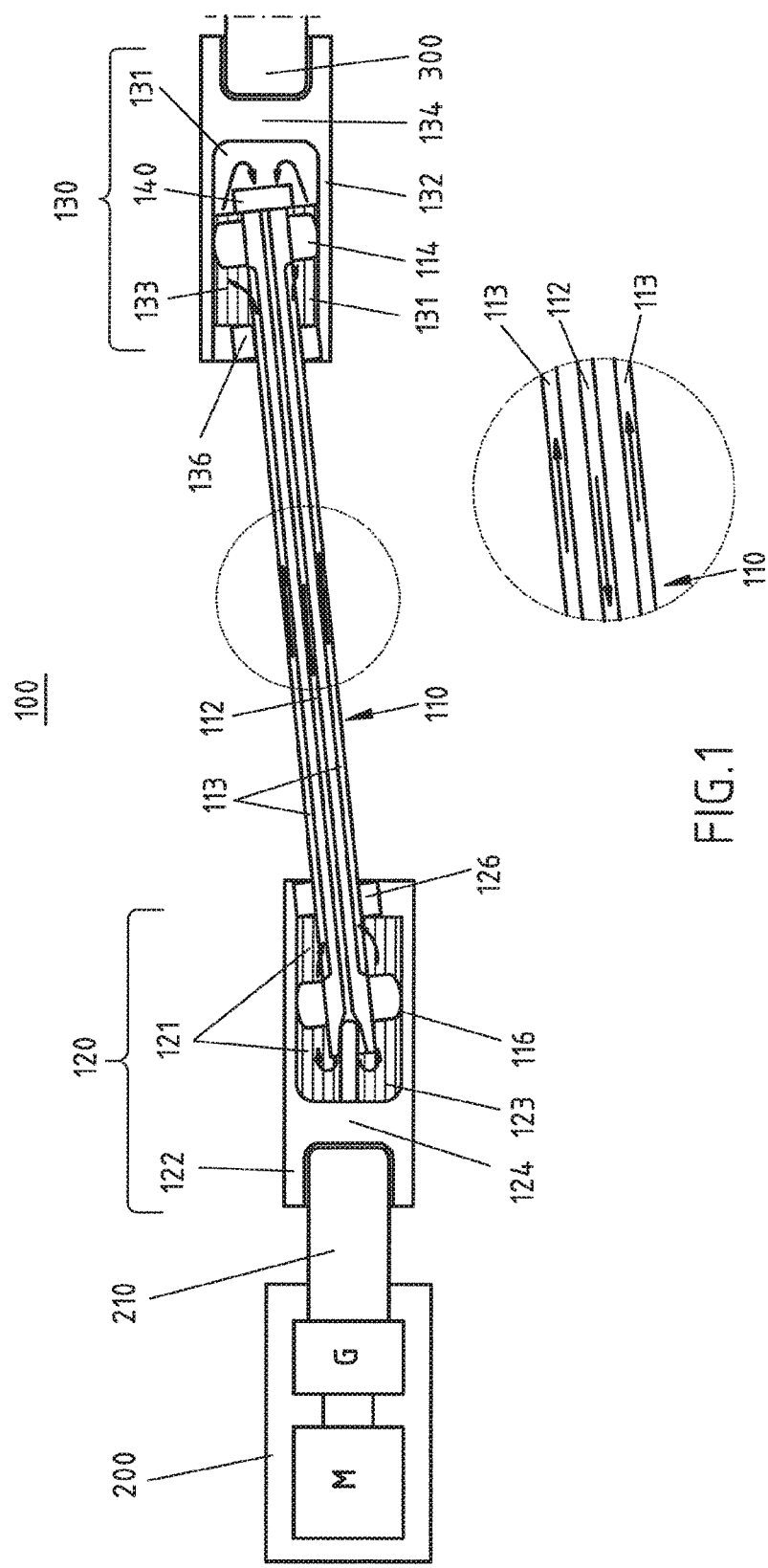
FIG. 1 a longitudinal section through the entire device.

FIG. 1 shows the device 100 according to the invention for transmitting a torque of a drive device 200 to the pins 300 of a roller in a roll stand for rolling stock, preferably a metallic rolling stock.

The drive device 200 typically consists of a motor unit M and a gear G, which is connected downstream and which outputs a torque at its output shaft 210. The drive-side end spindle 210 and the drive-side end of a spindle 110 are rotatably coupled to each other by means of a drive-side pivot bearing 120. The roller-side end of the spindle on the other side is rotatably coupled by means of a roller-side pivot bearing 130 to the pin 300 of the roller. In the drive-side pivot bearing is formed a drive-side lubricant chamber 121 and in the roller-side pivot bearing 130 is formed a roller-side lubricant chamber 131. In the lubricant chambers 121, 131, the respective ends of the spindle 110 are rotatably coupled to the pivot bearing. Both lubricant chambers are mutually fluidically connected to each other via a feed channel 112 and a reverse channel 113 for the lubricant in the area of the spindle 110. A closed circuit is thus realized for the lubricant between both lubricant chambers 121, 131.

The circulation of the lubricant within the circuit is realized with the aid of a pump device 140, which is built into or integrated in the circuit. The pump device 140 forms a channel section of the circuit, which as shown in the embodiment of FIG. 1, and which is connected the lubricant chamber 131 of the roller-side pivot bearing 130 that is connected to the reverse channel 113 to the feed channel 112 in the interior of the spindle in a fluidically conductive manner.

An important component of the roller-side pivot bearing 130 is a roller-side sleeve which is connected in a fixed manner to the pin 300 of the roller. In this sleeve is formed the roller-side end of the spindle, which is designed as a toothed articulated spindle, and which is rotatably connected through its outer toothing 114 to an inner toothing 133 of the roller-side sleeve 132. The lubricant chamber 131 is separated and sealed in the roller-side pivot bearing 130 by the pin of the of the roller via a radially extending separating wall 134 in the interior of roller-side sleeve. The lubricant chamber 131 is sealed and delimited in the radial direction by the roller-side sleeve 132 and the drive end of the lubricant chamber is sealed and delimited on the drive side by annular seal 136 which is set on top of the spindle 110. As can be seen in FIG. 1, the roller-side end of the spindle 110 is completely bathed with its outer toothing 114 and the pump device 140 in the lubricant in the roller-side lubricant chamber 131. The lubricant is supplied via the reverse channel 113 of the spindle to the lubricant chamber and discharged via the pump device 140 into the feed channel 112.

The drive-side pivot bearing 120 is constructed similarly to the roller side pivot bearing 130. It essentially consists of a drive-side sleeve 122, in which the output shaft 210 of the drive device 200 is mounted in a rotationally-fixed manner. A separating wall 124, extending radially into the sleeve 122, separates the area of the coupling of the output shaft 210 from a drive-side lubricant chamber 121. In the drive-side lubricant chamber 121 is rotatably coupled inside the drive-side sleeve 122 the drive-side end of the spindle 110 via an outer toothing 116 to an inner toothing 123 of the drive-side sleeve. The drive-side lubricant chamber 121 is on the one hand sealed and limited by said separating wall 124 and moreover, it is sealed and limited in the radial direction by the drive-side sleeve 122 and at the roller side by a ring seal 126 which is set on the spindle 110.

Figure 2:
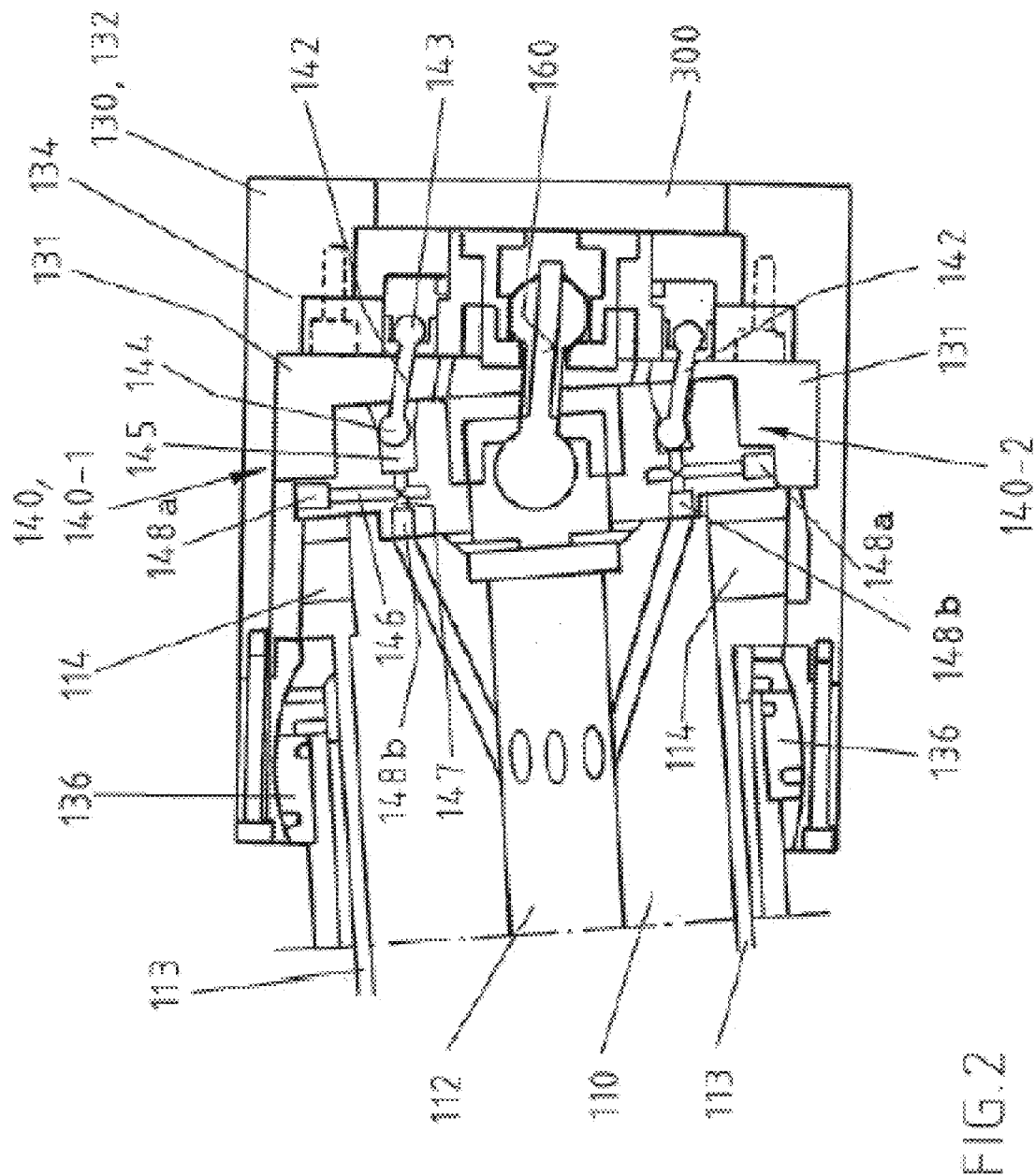
FIG. 2 a detailed view of the roller-side pivot bearing with the pump device.

FIG. 2 shows the roller-side pivot bearing, in particular with a detailed view of the separating wall 134 and of the pump device 140. Two pump devices, 140-1, 140-2 can be seen in FIG. 2, which are arranged on the roller-side front face of the spindle 110 and distributed over the periphery. Each of the pump device forms a channel section of the lubricant chamber circuit when they are connected between the return channel 113 and the feed channel 112 of the lubricant. In other words, the return channel and the feed channel are mutually connected to each other in a fluidically conductive manner with the pump device 140 for the lubricant. Each of the pump devices 140-1, 140-2 is provided with a lubricant piston 142, which is eccentrically mounted on the front face of the spindle, wherein the lubricant piston is provided with a fixed side 143 and with a loose side 144. The lubricant piston is fixed with its fixed side on the separating wall 134 in the axial direction, and with its loose side it is slidably mounted in a partial channel 145 of the channel section at the roller-side front face of the spindle. Said partial channel 145 and the lubricant chamber 142 form a first piston-cylinder unit by means of which the lubricant is pumped. The operation of the pump device will be explained in more detail in the description.

In addition to said piston-cylinder unit, the pump device 140 or the channel section of the pump device is provided with a plurality of mutually communicating partial channels 145, 146, 147, which are fluidically conductive and arranged in a stem-shaped form. A first number of these partial channels opens into the lubricant chamber 131, while a second number of the partial channels 147 opens into the feed channel 112 of the spindle 110. Furthermore, said partial channel 145 of the first piston-cylinder unit part of the channel sections is connected in a fluidically conducive manner to the other partial channels. The first number of the partial channels 146 can be closed to the lubricant chamber 131 by means of a return valve 148a . Similarly, the second number of the partial channels 147, which open into the feed channel 112 of the spindle 110, can be closed with the return valve 148b.

The channel sections of the individual pump devices 140-1, 140-2 are connected in parallel in a fluidically conductive manner.

Furthermore, as can be seen in FIG. 2, a ball joint connection 160 is provided, by means of which the roller-side front face of the spindle 110 is connected to the separating wall 134 in the roller-side sleeve 130. The ball joint connection serves to absorb or transmit translational forces and movements in axial direction. When the rollers are shifted with their roller pin 300, for example during the rolling operation, the spindle is axially shifted about the rotary joint connection.

The pump device 140 functions as follows:

The prerequisite is that first, the drive-side and the roller-side pivot bearing 120, 130 are shifted relative to each other in such a way that the drive shaft of the drive device and the pin 300 of the roller are not mutually aligned. With this constellation, the longitudinal axis of the spindle 110 and the longitudinal axis of the roller or of the roller pin 300 are then placed obliquely to teach other, as can be seen for example in FIG. 2.

As shown in the snapshot of FIG. 2, the upper lubricant piston 142 is located inside the first piston-cylinder unit extended far to the right and therefore it makes a large amount of the partial channel 145 freely available. This constellation creates a negative pressure in the remaining partial channel 145 which is fluidically connecting the partial channels 146 and 147 and thereby achieving that in a corresponding position of the return valve 148a , the return valve facing the spindle is closed and the return valve 148b associated with the lubricant chamber 131 is open. The lubricant is thus suctioned from the roller-side chamber 131 into the pump device 140 or more specifically into its partial channels.

With a rotation of the spindle 110 while its inclined position to the roller pin is maintained, the lubricant piston 142 is increasingly being shifted into the interior of the partial channel 145 in the direction toward the spindle 110, so that excess pressure is built up in the channel section or in its partial channels. In FIG. 2 can be seen the end position of the lubricant piston 142, which is achieved later with half a turn of the spindle by the lower lubricant piston. In this position, the lubricant piston 142 causes said excess pressure inside the partial channel, so that the return valve is closed to the lubricant chamber 131 and the return valve is opened to the feed channel 112. The lubricant that has been previously suctioned into the partial channels is thus pumped into the feed channel 112 as a result of the excess pressure. With a continuous rotation of the spindle, a continuous pumping movement thus takes place and the lubricant is pumped from the toothing region of the lubricant chamber into the feed channel of the spindle. The lubricant, which is exposed in the toothing region to a heavy load, is thus warmed up in this manner. By means of the pump device, it is removed from the load region and it can then be cooled off again when it flows through the spindle. However, for pumping it is essentially required that a liquid lubricant, especially oil and no fat. Depending on the position of the spindle, the lubricant may need to "flow uphill" under some circumstances. Oils that are practical for this purpose are of the type ISO VG 220 (liquid) up to ISO VG 1.000 (thick). The ideal temperature range is established mostly by itself based on the vicinity of the rolling mill and its load. The pump pressure is >1 bar.

FIG. 3 shows essentially what is already known from FIG. 1 with respect to the drive-side pivot bearing 120 and the drive-side end of the spindle 110 which is rotatably coupled to it. It can be seen also here that the feed channel 112 opens in the interior of the spindle in the drive-side lubricant chamber 121 for the lubricant and that the lubricant is conducted therefrom after passing the toothed joint with the external toothing 116 and the internal toothing 123 into the return channel 113.

Furthermore, FIG. 3 also shows a compensating container 150, which is used as a reservoir for the liquid lubricant and which is connected in a fluidically conductive manner via the connecting channel 117 to the circuit for the lubricant, which in FIG. 3 means that it is connected for example to the return channel 113.

The compensating container 150 is designed in the form of a second piston-cylinder unit. It comprises in the embodiment according to FIG. 3, which is shown merely by way of an example, an annular compensating cylinder 152 on the outer side of the spindle 110, which is arranged preferably coaxially to its longitudinal axis. In the annular compensating cylinder 152 is axially arranged an annular floating piston 154, which is to say so that it is displaceable for example parallel to the longitudinal axis of the spindle. The floating piston is exposed with one of its front faces, front face 155 to the pressure of the ambient air and with its other front face 156 it delimits the floating piston in the lubricant reservoir in the compensating container 150. In case of a translational movement of the roller, the spindle 110 and thus also the floating piston 154 are positioned automatically in such a way, which to say without an external influence and as needed, for an increased or reduced amount of the lubricant to be provided for the lubricant circuit.

In all the figures, the return channel 113 is designed so that it is offset, for example radially in the external direction on the periphery of the spindle. The thickness d of the outer wall of this channel should according to the invention not exceed a predetermined thickness threshold value, wherein the thickness threshold value is selected in such a way that a desired amount of heat in the lubricant flowing through the channel can be discharged via the outer wall 118 to the environment. As a rule, the outer wall 118 of the channel should be therefore as thin as possible and it should be constructed from a material that has good heat conductivity so that the amount of heat contained in the highly heated lubricant can be discharged to the ambient air during the flow of the lubricant through the pivot bearings 120, 130.

The protective tube and the compensating container are typically rotated along with a rotation of the spindle.

It is advantageous when lubricant inspection glasses can be provided for inspection and as a filling inlet and outlet opening for periodic exchange of the oil. The advantages of the device according to the invention include the self-sufficient system without component parts requiring maintenance, a low investment and operating costs, ensuring a good lubricating and cooling output with high-performance spindles, as well as the fact that sloshing of the lubricant back and forth is prevented with a self-sufficient, volume-regulated system.

The invention claimed is:

1. A device for transmitting a torque from a drive device to a roller in a roll stand for rolling a rolling stock, comprising:
   a spindle;
   a drive-side pivot bearing for rotatably coupling the spindle to a drive shaft of the drive device;
   a roller-side pivot bearing for rotatably coupling the spindle to a pin of the roller, whereby a lubricant chamber is formed in the roller-side pivot bearing; and
   at least one pump device is built in a circuit for liquid lubricant for supplying the liquid lubricant in the circuit;
   wherein in an area of the spindle is built a feed channel and a return channel for the lubricant, which are connected in a fluidically conductive manner to the lubricant chamber in the roller-side pivot bearing;
   wherein a lubricant chamber is built in the drive-side pivot bearing;,
   wherein the roller-side pivot bearing is provided with a roller-side sleeve, which is connected in a fixed manner with the pin to the roller-side pivot bearing, in which the roller-side end of the spindle is rotatably coupled to and engaged via its outer toothing by an inner toothing of the roller-side sleeve;
   wherein the lubricant chamber is sealed and delimited in the roller-side pivot bearing toward the pin of the roller by a separating wall radially extending through the interior of the roller-side sleeve, in the radial direction through the roller-side sleeve and sealed and delimited toward the drive side by a ring seal which is set on the spindle; and
   wherein the lubricant chambers in the roller-side and in the drive-side pivot bearing are mutually connected to each other, wherein the circuit for the lubricant is formed as a closed circuit.

2. The device according to claim 1, wherein the drive-side pivot bearing is provided with a drive-side sleeve which is non-rotatably connected to the drive shaft of the drive device, in which a drive-side end of the spindle is rotatably coupled and engaged with the drive-side end of the spindle via its outer toothing to an inner toothing of the drive side sleeve.

3. The device according to claim 2, wherein the lubricant chamber is sealed in the drive-side pivot bearing toward the drive device with a separating wall radially extending in the interior of the drive-side sleeve, in the radial direction by the drive-side sleeve and sealed toward the roller-side by a ring seal which is set on the spindle.

4. The device according to claim 3, wherein:
   the drive-side and the roller-side pivot bearings are arranged shifted relative to each other in such a way, that the output shaft of the drive device and the pin of the roller are not mutually aligned;
   the at least one pumping device is formed by a channel section of the circuit, which is connected in a fluidically conductive manner to the lubricant chamber connected to the return channel and in the roller-side pivot bearing to the feed channel in the area of the spindle; and
   the pumping device is further provided with a radially offset lubricant piston mounted on the roller-side front face of the spindle having a fixed side and a loose side, wherein the lubricant piston is fixed with its fixed side on the separating wall, in the roller-side sleeve in the axial direction, and with its loose side it is displaceably mounted in a partial channel of the channel section on the roller-side front face of the spindle, wherein the partial channel and the lubricant piston form a first piston-cylinder unit.

5. The device according to claim 4, wherein:
   the channel section is provided with a plurality of fluidically conductive partial channels, which are mutually communicating with each other and arranged in a stem shape, among which a first number opens into the lubricant chamber, in the roller-side pivot bearing, among which a second number opens into the feed channel in the area of the spindle, and among which another partial channel forms the first piston-cylinder unit; and
   the first number of the partial channels can be closed toward the lubricant chamber, in the roller-side pivot bearing, and the second number of the partial channels can be closed toward the feed channel in the area of the spindle with return channels.

6. The device according to claim 4, wherein a plurality of pump devices are arranged distributed on the roller-side front face of the spindle over the circumference, wherein the channel sections of the individual pump devices are respectively connected in the circuit in parallel in a fluidically conductive manner.

7. The device according to claim 1, wherein a compensating container is provided as a reservoir for the liquid lubricant, which is connected in a fluidically conductive manner for the lubricant to the circuit.

8. The device according to claim 7, wherein:
the compensating container is designed in the form of a second piston-cylinder unit, wherein a ring-shaped compensating cylinder is arranged on the outer side of the spindle and coaxially to its longitudinal axis; and
in the ring-shaped compensating cylinder is displaceably guided a ring-shaped floating piston which is axially shiftable, wherein the floating piston is exposed with its front face to the pressure of ambient air and with its other front face delimits the reservoir for the lubricant.

9. The device according to claim 1, wherein the feed channel for the lubricant is formed as an axial bore in the area of neutral fibers of the spindle and the return channel is radially offset in the outward direction formed as a coaxial channel on the periphery of the spindle, or vice versa.

10. The device according to claim 9, wherein the thickness of the outer wall of the channel, which is arranged offset in the outward direction, does not exceed a predetermined threshold value, wherein the thickness threshold value is selected in such a way that a desired heat amount of the lubricant flowing in the channel can be discharged by the outer wall into the environment.

11. The device according to claim 1, wherein a ball joint connection is provided for connecting the roller-side front face of the spindle to the separating wall in the roller-side sleeve.

* * * * *